Dec. 8, 1936.    J. A. WALLER    2,063,067
LAWN MOWER
Filed Aug. 29, 1932    2 Sheets-Sheet 1

INVENTOR
John A. Waller,
By Arthur A. Kingsland
Alfred W. Kingsland
ATTORNEYS

Dec. 8, 1936.   J. A. WALLER   2,063,067
LAWN MOWER
Filed Aug. 29, 1932   2 Sheets—Sheet 2

INVENTOR.
John A. Waller,
BY
ATTORNEYS.

Patented Dec. 8, 1936

2,063,067

UNITED STATES PATENT OFFICE 2,063,067

LAWN MOWER

John A. Waller, Beverly Hills, Calif.

Application August 29, 1932, Serial No. 630,831

3 Claims. (Cl. 56—252)

This invention relates to a device for cutting grass, lawn and the like and particularly to an improved form of lawn mower device having an improved cutting efficiency, which will maintain its cutting edges sharp for a much longer period than has been hitherto attainable, and will not clog or jam upon occasion that a particularly heavy area of grass is encountered.

The device of the present invention may comprise, in general, a rotatable cutting element mounted at the forward end of a suitable supporting structure and provided with operative engagement with a pair of driving wheels located rearwardly thereof and disposed inwardly of the lateral extremities of said cutting member, suitable handle means being provided for the device, extending rearwardly of said driving wheels in position to be grasped by a person standing erect, whereby the device may be moved forwardly over the area of lawn to be cut. In this manner the rotatable cutter is made to extend over a greater proportion of the lateral width of the entire device than has been hithertofore possible, the proportion of lateral width of the device occupied by the mechanical transmission means providing operative association of the cutter with the driving wheels being quite small in proportion to the total lateral width of the device.

One of the more important objects of the invention is to provide a device of the character described adapted to function equally well upon grass of substantially any length.

A further object of the device is to provide an improved type of lawn mower adapted to be operated with a lower expenditure of energy than is required by the conventional type of lawn mower.

A further object of the invention is to provide a lawn mower which is substantially free of tendency to jam or clog under heavy cutting stress.

A further object of the present invention is to provide a device of the character described provided with cutting means adapted to preserve a keen cutting edge for a materially longer period than that possible with the conventional types of comparable device hitherto proposed.

A further object of the invention is to provide a device which may be constructed at a lower cost than has been hitherto possible.

A further object of the invention is to provide, in a lawn mower, a stationary cutter fabricated of relatively hard metal, and a rotatable cutter fabricated of a material of less hardness than said stationary cutter, whereby upon continued engagement hereof in operation said rotatable cutter will be gradually worn away by said stationary cutter and a keen cutting edge maintained on both of said cutters.

One of the major features of the present invention lies in the specific form of rotating cutter employed in the cutting device. This cutter may comprise a single piece of metal having an X shaped cross-section, providing a plurality of projecting cutter elements or blades, said cutter being twisted so that each of the cutter elements thereof describes a helical path longitudinally of the cutter, said helical path being preferably of steep pitch as compared to the conventional type of cutter employed in lawn mowers hitherto proposed, whereby the cutter, in use, may reach around the grass blades in the cutting operation and draw the same inwardly toward the fixed cutting blade instead of being required to reach over the grass stems in order to bring the same into cutting relation with the fixed blade according to conventional practice. According to the present invention the rotatable cutter may be formed of relatively soft metal, such as "half-hard" steel and the fixed cutting element may be formed of a relatively hard metal such as "spring" steel, whereby the cost of production of the rotating cutter is materially less than the cost of comparable elements of the types hitherto proposed, and whereby said rotatable cutter is continuously sharpened during the grass-cutting operation by engagement of the cutting edges thereof with the aforementioned relatively hard fixed cutting element.

In connection with the above, one of the principal objects of the invention is to provide a rotatable cutter formed as one or more helices formed about an axis extending longitudinally with respect to a stationary cutter or cutting blade, the angle of inclination of each of said helices with respect to the cutting edge of said stationary cutter being relatively great as compared to that found in the conventional form of rotatable cutting blade used in lawn mowers hitherto proposed, and preferably in excess of 45°, whereby the angle of approach of the cutting edges of the rotatable cutter with respect to the cutting edge of the stationary cutter is relatively great.

According to a preferred embodiment of my invention, I provide a rotatable cutter having a plurality of cutting edges in the form of extended helices disposed across the forward end of a suitable supporting structure and rotatable therein, and a fixed cutting element secured to said structure and positioned for continuous engagement by one or more of said cutting edges of said rotatable cutter, said rotatable cutter being provided with a spring-biased hinge mounting on said supporting structure, effecting the aforesaid engagement. The rotatable cutter is provided with means disposed at the respective lateral ends thereof providing operative association with a pair of driving wheels located rearwardly of said rotatable cutter, said driving wheels being secured to said supporting structure and disposed inwardly of the corresponding lateral extremities of said rotatable cutter. Means are preferably provided in the device of the present invention for effecting rotation of the said rotatable cutter upon rotation of the driving wheels in but one direction, namely, in such direction as to cause the device to move forwardly to engage the grass or lawn to be cut, such means advantageously comprising ratchet means interposed at some point in the mechanism operatively connecting the driving wheels to the rotatable cutter.

Operative association of the cutting element with the driving wheels may be effected by means of a chain drive, or as herein shown as a preferred embodiment, by means of a gear train comprising gear means on each end of said rotating cutter, gear means on said driving wheels and idler gear means disposed intermediate said first- and second-named gear means and in engagement therewith.

The device of the present invention is also preferably provided with handle means whereby the device may be moved forwardly over an area to be cut, said handle means comprising, in the form shown, a handle of the type conventionally used in lawn mowers and the like, pivotally mounted on the supporting structure of the device at or adjacent the axis of rotation of said driving wheels, and provided with a spring or other resilient means secured to said structure and bearing against said handle means in such manner that upon downward movement of said handle means the aforementioned supporting structure, together with the cutter assembly mounted thereon, is biased upwardly about the axis of rotation of said driving wheels, such structure being more fully set forth in my copending application Ser. No. 757,740, filed December 17, 1934.

Other objects and features of novelty of the present invention will be pointed out in the succeeding detailed description of the device or will be apparent therefrom. Attached hereto are a number of figures of drawings showing the various features of construction of the present invention and referring thereto:

Figure 1:
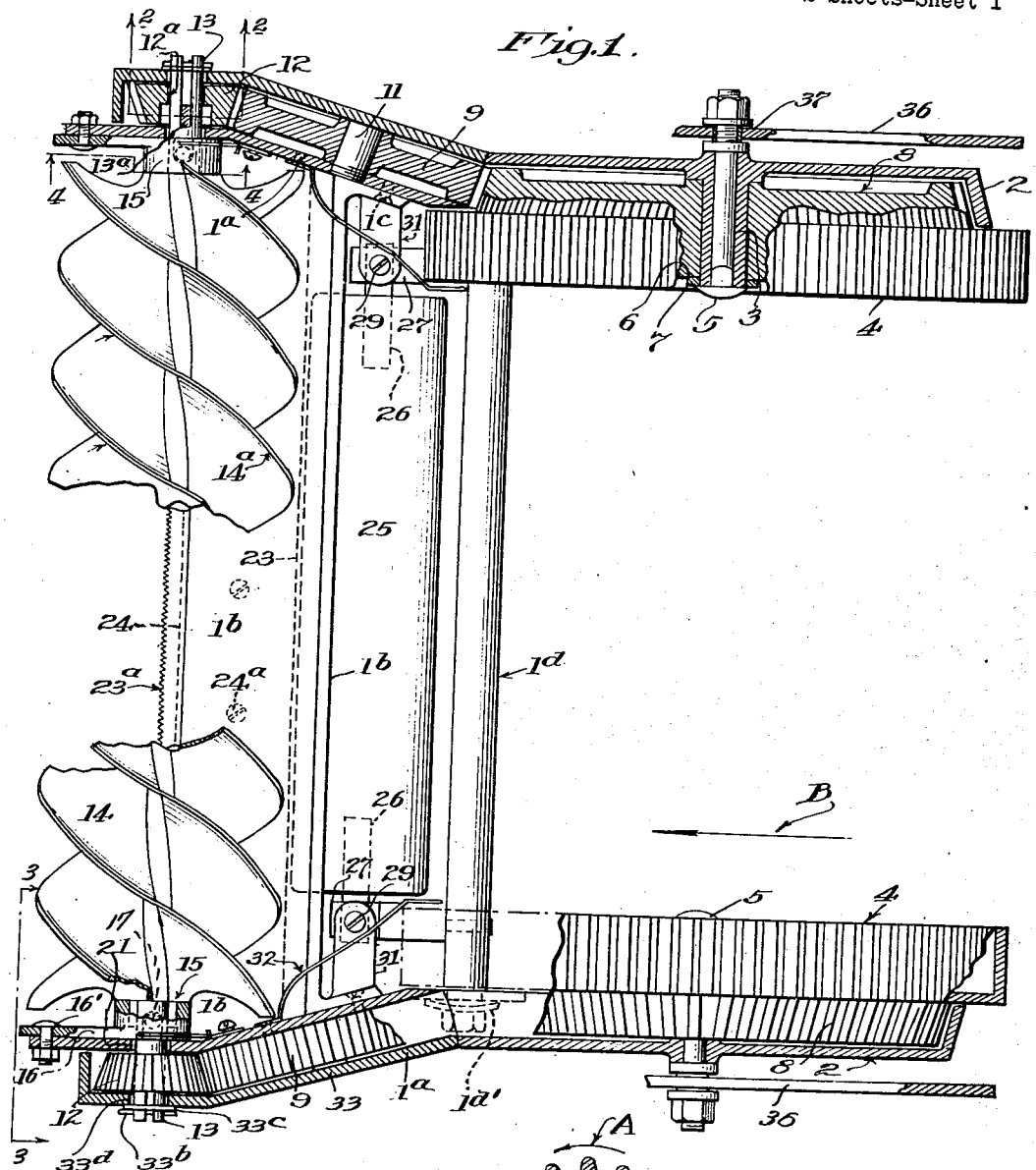
Fig. 1 is a partly broken away plan view of the lawn mower device provided with cutter means according to the present invention.

Referring to the drawings the form of device shown in Figs. 1 to 4 may comprise a supporting structure generally designated by the numeral 1, comprising side members 1a and a transverse member 1b secured to said side members in any suitable manner, as for example, by means of screws or bolts 1c. The side members 1a further preferably each comprise a housing portion 2 provided with a stub shaft 3 adapted to receive and be supported by a driving wheel 4 providing rear supporting means, said wheel being secured to said housing in any suitable manner, as for example, by means of a carriage bolt 5, extending through the shaft 3 and engaging the wheel 4 at the hub portion thereof indicated at 6 through a washer 7 keyed to a shaft 3. The driving wheels are mounted on a common axis of rotation and each driving wheel is provided with a bevel gear 8 formed integrally therewith on the outer face thereof and meshing with a spur gear 9 mounted on the member 1a in any suitable manner, as for example, by means of a stub shaft 11, this gear in turn meshing with a bevel pinion 12 secured to the shaft portion 13 of the rotatable cutter 14. The cutter 14 may be supported on the side members 1a by means of a roller bearing 15 mounted on arm 16 pivotally disposed on the frame as at 16', said bearing being limited in downward movement by means of a set-screw 17 extending through a lug 18 provided on the side wall 1a and biased downwardly against said set-screw by means of a spring or other resilient element 19.

It will be understood that the two sides of the device of the present invention are substantially equivalent as regards the character and disposition of the component elements thereof, and generally throughout this specification description of but one side or the other of the device will be made.

The rotatable cutter 14 may comprise a screw-shaped member of any suitable cross-section, it being understood, however, that a cutter may be provided with any desired number of cutting elements or blades 14a, the number of such cutting elements being immaterial to the present invention and the form shown in the drawings being selected merely for purposes of description.

Figure 2:
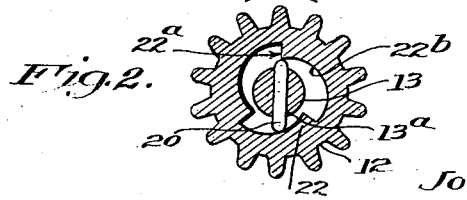
Fig. 2 is an enlarged sectional detail thereof taken on line 2—2 in Fig. 1.

The shaft portions 13 of the rotatable cutter 14 extend through the supporting structure side wall 1a through a slot 21, said slot being vertically elongated in the manner shown to allow for vertical movement of said shaft about the center of pivotal movement 16' thereof. The gear 12 is preferably mounted on the shaft ends 13 in such manner as to provide operative engagement of said gear with said shaft upon rotation thereof in one direction, namely, in a counter clock-wise direction as shown in Fig. 2, and to rotate freely thereon when rotated in the opposite direction. Any suitable form of ratchet clutch means may be employed for this purpose and I have shown as an example a ratchet clutch of a type customarily employed in the conventional type of lawn mower which, referring to Figs. 1 and 2, may comprise a rectangular pin 20 mounted for sliding movement in a slot 13a provided in the shaft ends 13 and adapted to be engaged by the forward surface 22a of any one of a plurality of cams 22 upon rotation of the gear 12 in the direction indicated by the arrow A in Fig. 2, the rearward face of the cams 22 being shaped as shown at 22b so that upon reverse rotation of said gear the pin 20 is caused to reciprocate in the slot 13a without engagement thereof by the cam surfaces 22a and thus allow free rotative movement of the gear 12 upon the shaft end 13, said gear being provided with a hub portion 12a rotatably engaging shaft end 13 as shown in Fig. 1. It is thus seen that upon forward movement of the device in the direction indicated by the arrow B in Fig. 1 a rotation of the wheels 4 and gears 8 in a counter clock-wise direction is effected, obtaining a similar rotation of the gears 12 through the idler gears 9, effecting operation of the rotatable cutter in the direction indicated by the arrow A in Fig. 2.

Figure 3:
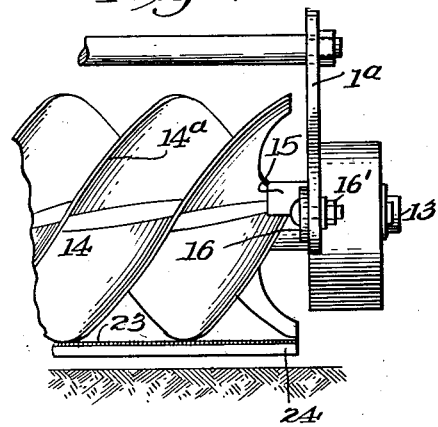
Fig. 3 is a broken-away view of a portion thereof taken on line 3—3 in Fig. 1.

I provide a stationary cutting blade 23 secured to the supporting structure cross member 1b in any suitable manner, as by means of a clamping plate 24 secured to the member 1b through screws 24a; said blade being so positioned that the upper edge of the forward face thereof is engaged by the cutting blades of the rotatable cutter, as shown. The forward face 23a of the stationary cutting blade is preferably provided with a plurality of serrations extending across its forward face and transversely thereof, as shown in Fig. 3, the utility of which will be pointed out in connection with the description of the operation of the device.

I provide a support for the forward end of the device for the purpose of regulating the cutting height thereof, that is, the elevation of the stationary cutting blade 23 with respect to the ground level, which support may comprise a roller 25 formed of wood or any other suitable material and provided with shaft ends 26 projecting axially therefrom and engaged by a bearing 27 supported on an arm 28 secured to a frame cross member 1d secured to the supporting structure side portion 1a, said cross member being preferably disposed upon said side portion 1a in such manner as to allow of forcible rotation with respect thereto, said cross member being frictionally engaged by said side members in any suitable manner, as for example, through spring washers as shown at 1d' so as to prevent free movement thereof. For the purpose of adjustably limiting the upward movement of said roller with respect to the remainder of the device I provide a set-screw 29 extending through a lug 31 formed on the transverse supporting structure member 1b and bearing against the upper portion of the shaft bearing 27, whereby upon adjustment of the set-screw 29 the roller 25 may be raised or lowered with respect to the supporting structure and thus cause a depression or elevation of the fixed blade 23 with respect to the ground level.

It will be seen that the roller 25 is of less axial length than the rotatable cutter 14, whereby said roller, which, as above outlined, comprises the forward supporting means of the device, is caused to rest upon grass lying within the width of the cutting swath so that no matting of un-cut grass is obtained by said roller during operation of the device.

If desired, a shield 32 may be provided extending vertically alongside the supporting structure end portions 1a after the manner shown in Fig. 1, whereby any grass thrown from the transverse extremities of the cutting blade 14 will be directed to the space between the driving wheels 4, within which space a suitable grass-catcher (not shown) may be provided.

A suitable cover 33 or the like may be provided exteriorly of the gears 9 and 12 in order to protect the same from damage, said cover being secured to the end portions of the supporting structure as by means of screws 33a at the rearward portion thereof and by a cotter-pin 33b extending through the outer end of shafts 13, a suitable washer 33c being provided between said cotter-pin and the outer wall of the cover 33, said cover being further provided with a slot 33d of the same general character as the slot 21 aforesaid through which said shaft ends may project. The aforementioned cover 33 serves the double purpose of protecting gears 9 and 12 from damage and to keep the said gears in place on their respective shafts.

I prefer to make the gears 12 of less diameter than the cutter 14 and of relatively small axial thickness, and the supporting structure side portion 1a and the gear cover 33 of such size and proportional dimensions with respect to the size of said cutter that the lower faces of such portions of said supporting structure and cover which project laterally beyond the ends of the rotatable cutter are disposed above the bearing or supporting plane of the device, said plane being defined by the bottom of the roller 25 and the bottom of the drive wheels 4. Said projecting portions are preferably also disposed above the plane of the fixed cutter, whereby the device of the present invention is permitted to function in the most effective manner when used to cut grass or lawn adjacent the edge portions of such lawn, as for example, against a walk or curbing.

Suitable operating handle means are provided for the device whereby the device may be moved along a lawn surface to be cut, and I have fully described an advantageous form of handle means in the above-mentioned copending application Ser. No. 757,740, but in the present drawings I have merely indicated the lower end portions 36 of a suitable handle means which may be pivotally secured to the driving wheels by means of the bolt 5, as shown at 37, so as to permit relative pivotal movement of the handle and the supporting structure about the axis of rotation of the driving wheels.

The supporting structure of the present device may be provided with an additional transverse tie rod, if desired, adjacent the forward portion thereof as shown at 39.

While I have shown a rotatable cutter provided with four cutting edges 14a I have found that the actual number of cutting blades is a matter of choice and is dependent upon the gear ratio between the rotatable cutter and the driving wheels. For example, if I use a cutter formed from a flat strip of metal twisted about an axis extending longitudinally thereof so as to form two oppositely disposed cutting edges, I preferably so select the gear ratio so that double the number of revolutions of the rotatable cutter is obtained upon a unitary movement of the driving wheels, as compared to the speed of rotation of the rotatable cutter when four cutting edges are used, after the manner shown in the drawings. I do prefer, however, to preserve the pitch of the cutting blades, that is, the horizontal angle of approach of the rotatable cutting blade with respect to the stationary blade, not less than 45°, and preferably in the neighborhood of 60°. A mower provided with a cutter of the above described character is capable of cutting grass, weeds, or the like, with a much less expenditure of energy than is required by the forms of mowers hitherto proposed due to this increased angle of approach of the rotating cutting edges. This particular design of rotating cutter is obviously adaptable to the conventional form of lawn mower now in use and I do not wish to be limited to the use of my improved form of cutter solely in connection with the present described complete device.

The device of the present invention is adapted to be moved over a lawn in the direction shown by the arrow B in Fig. 1, the driving wheel being caused to rotate in a counter clock-wise direction as above described, effecting a counter clockwise rotation of the rotating cutter 14. The individual cutting blades 14a reach around the grass stem and force the same between the moving rotating cutter edges and the relatively stationary cutting blade 23, in which position the grass blades are subjected to a shearing action of the cutting edges and cut. The severed portions of grass are thrown rearwardly of the rotating cutter and into the space between the driving wheels 4 and into a suitable grass-catcher provided as above suggested. The forward face of the stationary cutting blade 23 may be provided with a plurality of serrations above described and shown at 23a, these serrations serving to prevent crowding the grass blades to one side of the mower due to the lateral thrust imposed thereon by the rotating cutter blades.

Figure 4:
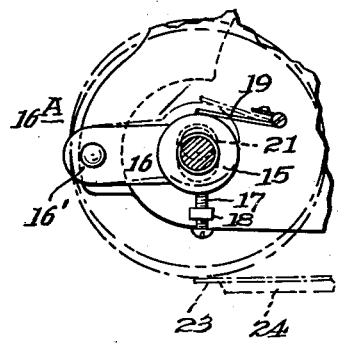
Fig. 4 is another detail thereof taken on line 4—4 in Fig. 1.

Upon occasion that a foreign object such as a stone be caught by the rotating cutter blades and forced against the stationary blade 23, the rotating cutter is allowed to lift away from the stationary cutter due to the manner of mounting of said rotatable cutter. Referring to Fig. 4 this lifted position is shown in dot and dash lines at 16A. In this position the foreign object is generally allowed to pass between the cutting blades or forced to one side thereof without damage thereto, after which the rotatable cutter will immediately drop into position of engagement with the stationary cutter.

The hinged mounting of the rotatable cutter also provides for a constant take-up of the wear thereof, eliminating frequent manual adjustment thereof. In the conventional type of lawn mower the rotatable cutter edges are of hardened steel and require frequent sharpening to maintain the same in optimum cutting condition and whenever such a rotatable cutter is reground, a new adjustment of the stationary cutter is required, the sharpening and adjusting of the device ordinarily requiring the services of a skilled mechanic and the use of special tools. The present device may be used for a remarkably long period without any sharpening whatsoever, until the rotatable cutter has been worn down as much as for example, 10 per cent, after which time it is merely necessary to remove the cutter and replace the same with a new part. A new stationary blade may be replaced at the same time. According to the observed performance of a lawn mower constructed after the manner of the present invention, it is estimated that if the device is used by an average householder, replacement of the cutting surfaces will not be necessary for a number of years, but if such replacement is required due to excessive use the cost thereof will generally not exceed the ordinary cost of an ordinary resharpening of the conventional lawn mower. The cost of manufacture of the rotatable cutter of the present invention is very small as compared with the cost of manufacture of the rotatable cutter hitherto proposed in view of the very small amount of machine work necessary thereon.

Figure 7:
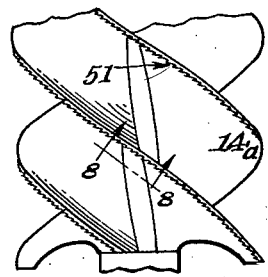
Fig. 7 is a fragmentary view of a modified form of rotatable cutter adapted to be used in the device of the present invention.
Figure 8:
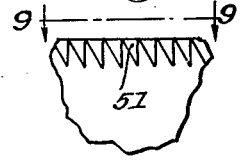
Fig. 8 is a detail thereof on somewhat enlarged scale taken on line 8—8 in Fig. 7.
Figure 9:
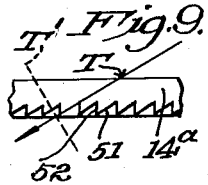
Fig. 9 is a plan view thereof taken on line 9—9 in Fig. 8.

As shown in Figs. 7 to 9, I may provide saw tooth serrations on the approaching surfaces of the cutting blades 14a of the rotatable cutter 14, these serrations, indicated by the number 51, being adapted to assist the serrations shown at 23a in holding the grass blades against lateral movement during the cutting operation, or a rotatable cutter having the above described serrations 51 may be used in conjunction with a stationary cutter provided with a plane forward edge. Figs. 8 and 9 show an enlarged detail of these cutting blades, and referring to Fig. 9 these serrations 51 provide a plurality of abrupt face portions 52 so disposed laterally with respect to the angle of approach of the cutting blade toward the stationary cutter that the same are capable of engaging the grass blades in the described manner. For purpose of illustration I have indicated the direction of travel of the rotating cutting blade with respect to the fixed cutter by the arrow T, the position of relative disposition of the fixed cutter being indicated by the dotted line T'.

Figure 5:
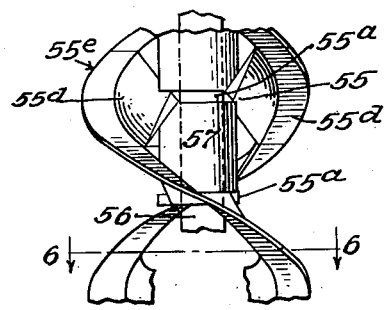
Fig. 5 is a broken-away plan view of a modified form of rotatable cutter according to the present invention, composed of a plurality of separate cutting elements providing a plurality of cutting edges disposed as continuous helices.
Figure 6:
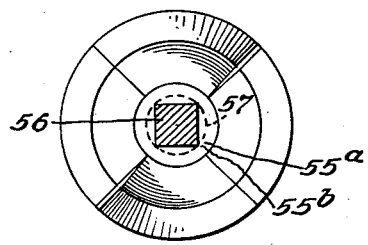
Fig. 6 is a sectional view thereof taken on line 6—6 in Fig. 5.

While I have shown my rotatable cutter 14 as formed of a continuous strip of metal, it is conceivable that it may be formed of a plurality of separate elements mounted on a square shaft and provided with suitable spacing means separating the same. As a matter of fact, I actually contemplate constructing the rotatable cutter in this manner, each of the aforesaid elements being stamped from a flat plate and mounted on a square shaft so as to rotate coincidentally. I have shown in Figs. 5 and 6 a form of rotatable cutter which may comprise a plurality of elements 55 each having a transversely extending center portion 55a provided with a square opening 55b adapted to receive a square shaft 56, and a plurality of upwardly extending edge portions 55d, formed integrally with said center portion, said edge portions being bent in opposite directions as shown so that the outer edge portions thereof 55e describe a plurality of helices in the same general manner as hereinbefore described. Two similar elements 55 may be disposed adjacent one another, rotated 90° with respect to one another and thus provide a continuation of the above mentioned helices. Suitable spacing washers 57 may be provided, separating the center portions 55a of the several elements, if desired, whereby assembly thereof is facilitated. Any suitable means may be provided at opposite ends of the shaft 56 for compressing the several elements 55 axially into engagement with each other. While the form of cutter shown in Figs. 5 and 6 is provided with but two helical cutting edges, it will be understood that any desired number may be provided without departing from the spirit of this invention.

I claim:

1. In a lawn mower, a rotatable cutter having a plurality of helically disposed cutting blades provided with cutting faces disposed forwardly in the direction of rotation of said cutter; a stationary cutter positioned to engage said rotatable cutter blades at the outer edges of said cutting faces, the cutting face on each rotatable cutter blade having a plurality of saw-tooth-shaped grass-engaging serrations providing opposing face portions comprising an abrupt laterally disposed face portion and a face portion extending substantially in the direction of travel of said cutting face.

2. In a lawn mower, the construction set forth in claim 1, said stationary cutter being of relatively hard metal and said rotatable cutter being of metal of materially less hardness than said stationary cutter, whereby the wear occasioned by engagement of said blades with said stationary cutter is confined substantially to said blades.

3. In a lawn mower, a rotatable cutter having a plurality of cutting blades each having a cutting edge, a stationary cutter positioned to engage said rotatable cutter blades at said cutting edges, said stationary cutter being of relatively hard metal and the cutting blades of said rotatable cutter being of metal of materially less hardness than said stationary cutter, whereby the wear occasioned by engagement of said blades with said stationary cutter is confined substantially to said blades.

JOHN A. WALLER.